United States Patent [19]

Kuhn, Jr.

[11] Patent Number: 5,574,525
[45] Date of Patent: Nov. 12, 1996

[54] DOUBLE EXPOSURE PREVENTION APPARATUS

[75] Inventor: Robert L. Kuhn, Jr., Rush, N.Y.

[73] Assignee: Eastman Kodak Company, Rochester, N.Y.

[21] Appl. No.: 385,291

[22] Filed: Feb. 10, 1995

[51] Int. Cl.⁶ .................................................. G03B 19/10
[52] U.S. Cl. .......................... 396/538; 396/389; 396/515
[58] Field of Search .......................... 354/275, 21, 174, 354/400, 410, 207; 352/78 R, 78 C

[56] References Cited

U.S. PATENT DOCUMENTS

| | | | |
|---|---|---|---|
| 4,994,828 | 2/1991 | Smart | 354/21 |
| 5,032,861 | 7/1991 | Pagano | 354/275 |
| 5,047,794 | 9/1991 | Pagano et al. | 354/275 |
| 5,049,912 | 9/1991 | Pagano et al. | 354/275 |
| 5,049,913 | 9/1991 | Pagano et al. | 354/275 |
| 5,079,579 | 1/1992 | Pagano et al. | 354/275 X |
| 5,079,799 | 1/1992 | Rude et al. | 16/342 |
| 5,138,350 | 8/1992 | Cocca | 354/21 |
| 5,159,365 | 10/1992 | Takahashi et al. | 354/275 X |
| 5,221,939 | 6/1993 | Taniguchi et al. | 354/173.1 |
| 5,234,174 | 8/1993 | Pagano et al. | 354/275 X |
| 5,278,600 | 1/1994 | Takahashi et al. | 354/275 |
| 5,280,327 | 1/1994 | Stoneham et al. | 354/275 |
| 5,296,887 | 3/1994 | Zander et al. | 354/275 |
| 5,347,334 | 9/1994 | Smart et al. | 354/275 |
| 5,359,378 | 10/1994 | Zander et al. | 354/275 |
| 5,382,992 | 1/1995 | Kawamura et al. | 354/21 |
| 5,477,289 | 12/1995 | Smart | 354/207 X |

*Primary Examiner*—D. Rutledge
*Attorney, Agent, or Firm*—Peter J. Bilinski

[57] ABSTRACT

In a camera, an apparatus to be used with a film cassette having a film-exposure status indicator which is movable from an unexposed position, to indicate that a filmstrip within the cassette is unexposed, to a partly exposed position to indicate that the filmstrip is only partly exposed, and to a fully exposed position to indicate that exposure of the filmstrip is completed. According to the invention, the camera includes a loading chamber sized for receiving the cassette, and a blocking member which cooperates with the status indicator for blocking the cassette from entering the loading chamber when the status indicator indicates that film contained within the cassette has been at least partly exposed. The apparatus also includes a switch element for sensing the presence of an unblocked cassette loaded into the chamber made from a spring material mounted for retaining and for biasing the blocking member in the loading chamber while simultaneously biasing the switch element in a first position. The switch element when opened by an unblocked cassette allows film from the cassette to be loaded into the camera but prevents the reloading of film until the switch is closed and reopened.

10 Claims, 14 Drawing Sheets

DOUBLE EXPOSURE PREVENTION APPARATUS

CROSS-REFERENCE TO RELATED APPLICATION(S)

Reference is made to commonly assigned copending applications Ser. No. 08/386,792 entitled: APPARATUS FOR PREVENTING DOUBLE EXPOSURE OF A THRUST FILM CARTRIDGE filed in the names of J. David Cocca, Paul L. Taillie, and Beth A. O'Leary, and Ser. No. 08/385,292, entitled: CARTRIDGE SENSING DEVICE filed in the name of Robert L. Kuhn, Jr., each of which are assigned to the assignee of this application.

FIELD OF THE INVENTION

The invention relates generally to the field of photography, and in particular to cameras. More specifically, the invention relates to an apparatus which prevents the double exposure of film, preferably contained in thrust type film cartridges.

BACKGROUND OF THE INVENTION

In thrust type 35 mm film manufacturers' cassettes, such as those manufactured by Eastman Kodak Co. and Fuji Film Photo Ltd., a leading portion of a film strip is thrust from the confines of a loaded film cassette onto a take-up spool rather than having to manually extract the protruding leading portion, as is common to other conventional non-thrusting film cassettes. This is particularly advantageous in that a protruding portion of the film is not required and that a user does not have to take the time to manually extend the leading portion of the film for cinching to a take-up spool prior to image capture.

Another advantage realized using thrust type film cassettes is that a partially exposed film can be rewound into the cassette, and be extracted from the confines of the camera. The cassette can then be reloaded into a camera having particular logic for allowing the film strip to be thrust and properly advanced to the next exposable frame prior to image capture. The features of rewinding a partially exposed film back into the cartridge and for subsequent exposure of the previously unexposed film is referred to as mid-roll interrupt (MRI).

In commonly assigned U.S. Pat. No. 4,994,828, there is described an apparatus for preventing an exposed film thrusting cartridge from being loaded into a film chamber of the camera. A blocking member, having an engageable end is biased by a leaf spring into the film loading chamber of a camera featuring drop-in loading. The blocking member cooperates with the status indicator of the film cartridge to prevent the cartridge from being loaded in the film chamber if the cartridge contains either exposed or partially exposed film. If the film cartridge, however, contains fresh film, or in cameras having MRI logic partially exposed film, the blocking member is pivoted out of the chamber and the cartridge can be loaded.

In commonly assigned and concurrently filed U.S. Ser. No. 08/386,792, filed by J. David Cocca, Paul L. Taillie, and Beth A. O'Leary, a cartridge sensing element is separately provided adjacent the blocking member to prevent the double exposure of a loaded film cartridge after the film contained therein has been either partially or fully exposed and then rewound into the cartridge.

In a preferred embodiment, the cartridge sensing element is a resettable electrical switch which is biased in a first position by another leaf spring cooperates with the blocking member so that when urged out of the chamber by an unblocked cassette, a portion of the blocking member opens the switch, breaking an electrical connection with a contact surface. The opening of the switch is sensed by a controller which enables a film advancing means to load film from the unblocked cassette and prevents the film from being reloaded until the switch undergoes another close to open transition.

It is desirable to attempt to combine the features of the sensing element and the blocking member to provide an efficient double exposure prevention apparatus for film cartridges, particularly thrust type cartridges.

SUMMARY OF THE INVENTION

The present invention is directed to overcoming one or more of the problems set forth above. Briefly summarized, according to one aspect of the present invention, there is provided in a camera, an apparatus to be used with a film cassette having a film-exposure status indicator which is movable from an unexposed position, to indicate that a filmstrip within the cassette is unexposed, to a partly exposed position to indicate that the filmstrip is only partly exposed, and to a fully exposed position to indicate that exposure of the filmstrip is completed, said camera having a loading chamber sized for receiving said cassette, and blocking means cooperating with said status indicator for blocking said cassette from entering said loading chamber by engagement therewith when said status indicator indicates that film contained within the cassette has been at least partly exposed, characterized by:

a sensing member which cooperates with said blocking means to sense an unblocked film cassette in said chamber, said sensing member including biasing means for simultaneously biasing said sensing member in a first position and said blocking means into said loading chamber for engagement with a said film cassette.

According to another aspect of the invention, there is provided an apparatus for use with a film cassette having a film exposure status indicator for indicating the presence of exposed, partly exposed, and fully exposed film, said camera having a loading chamber sized for receiving said cassette, and blocking means which cooperates with the film status indicator by engagement therewith to prevent a film cassette containing exposed film from being loaded in said chamber, is characterized by:

a resettable switch element which cooperates with said blocking means for sensing the presence of a film cassette in said loading chamber, said switching element being enabled when an unblocked cassette is loaded in said chamber, said switching element including means for biasing said blocking means for engagement with said film exposure status indicator prior to the loading of a said cartridge.

An advantageous aspect of the present invention is that an integral double exposure prevention apparatus for thrust type film cartridges is provided which is efficient, simple to manufacture, and reliable.

A still further advantageous aspect of the present invention is that a sensing element of the apparatus provides additional functions by retaining and biasing the blocking member into the chamber of the camera, thereby eliminating the need for separately attached mechanisms, and reducing the size and cost of a camera having these biasing mechanisms.

These and other aspects, objects, features and advantages of the present invention will be more clearly understood and appreciated from a review of the following Detailed Description of the Preferred Embodiments and appended Claims, and by reference to the accompanying Drawings.

DETAILED DESCRIPTION OF THE INVENTION

The invention is disclosed as being embodied preferably in a still photographic camera. Because the features of this type of camera are generally well known, the description which follows is directed in particular to elements forming part of or cooperating directly with the disclosed embodiment. It is to be understood, however, that other elements not specifically shown or described may take various forms known to persons ordinarily skilled in the art.

The Film Cassette

Figure 1:
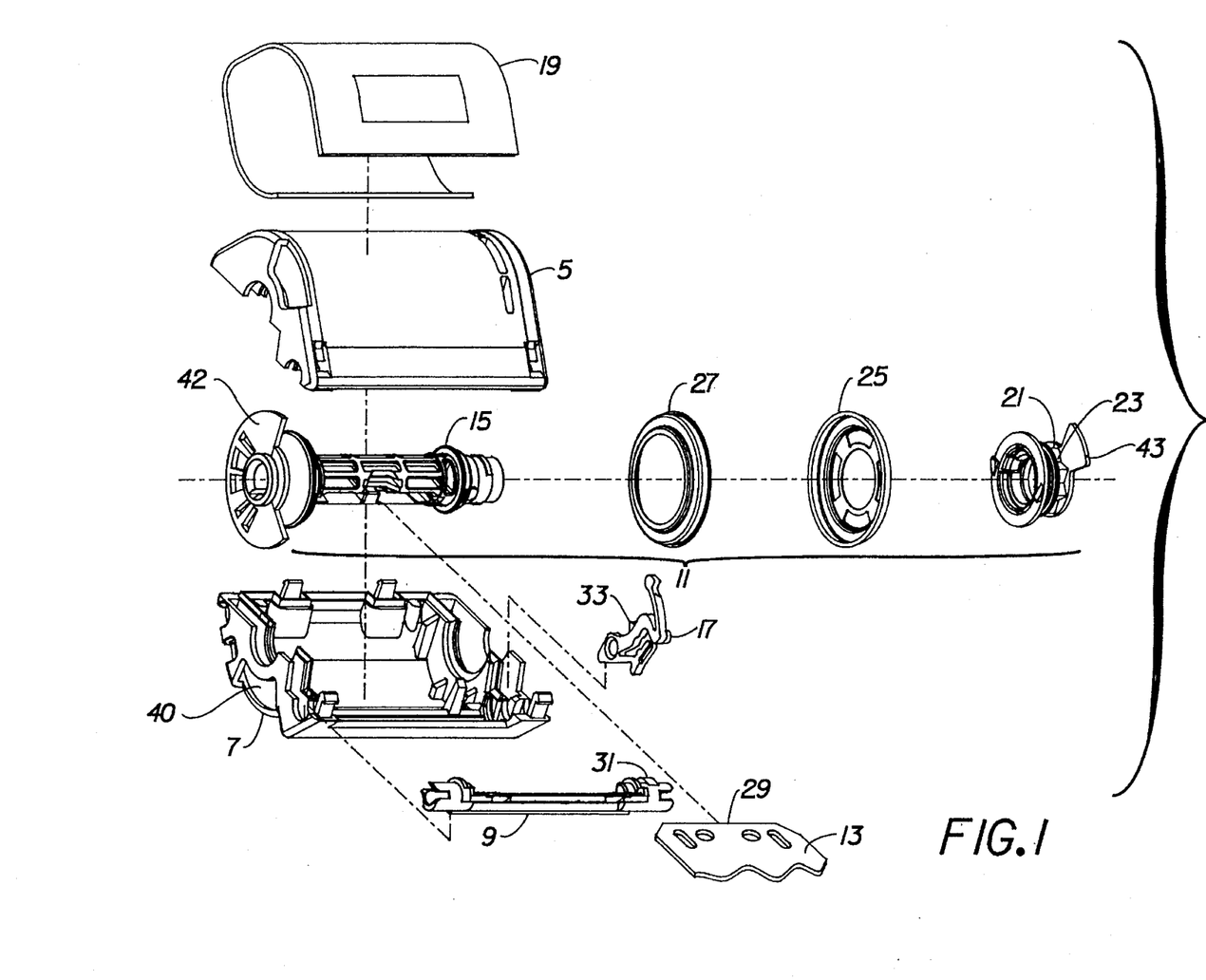
FIG. 1 is an exploded perspective view of a film cassette according to a preferred embodiment of the present invention.

Referring now to the drawings, FIG. 1 is an exploded perspective view of a film cassette 1 in accordance with a preferred embodiment of the invention. Generally, the film cassette 1 comprises a cassette shell 3, FIG. 2, constructed of carbon-black plastic material and made up of two mating shell halves 5 and 7, a similarly constructed light shielding door 9 closed to prevent ambient light from entering the cassette interior through a film ingress/egress slot located between the two shell halves and opened to permit film movement into and out of the cassette interior via the film ingress/egress slot, a film spool 11, FIG. 2, supported for rotation inside the cassette shell in opposite film unwinding and winding directions to unwind a filmstrip 13 off a spool core 15 and to wind the filmstrip 13 onto the spool core, a spool lock 17 for engaging the spool core to prevent rotation of the film spool and out of engagement to release the film spool, and a cassette covering label 19.

Figure 5:
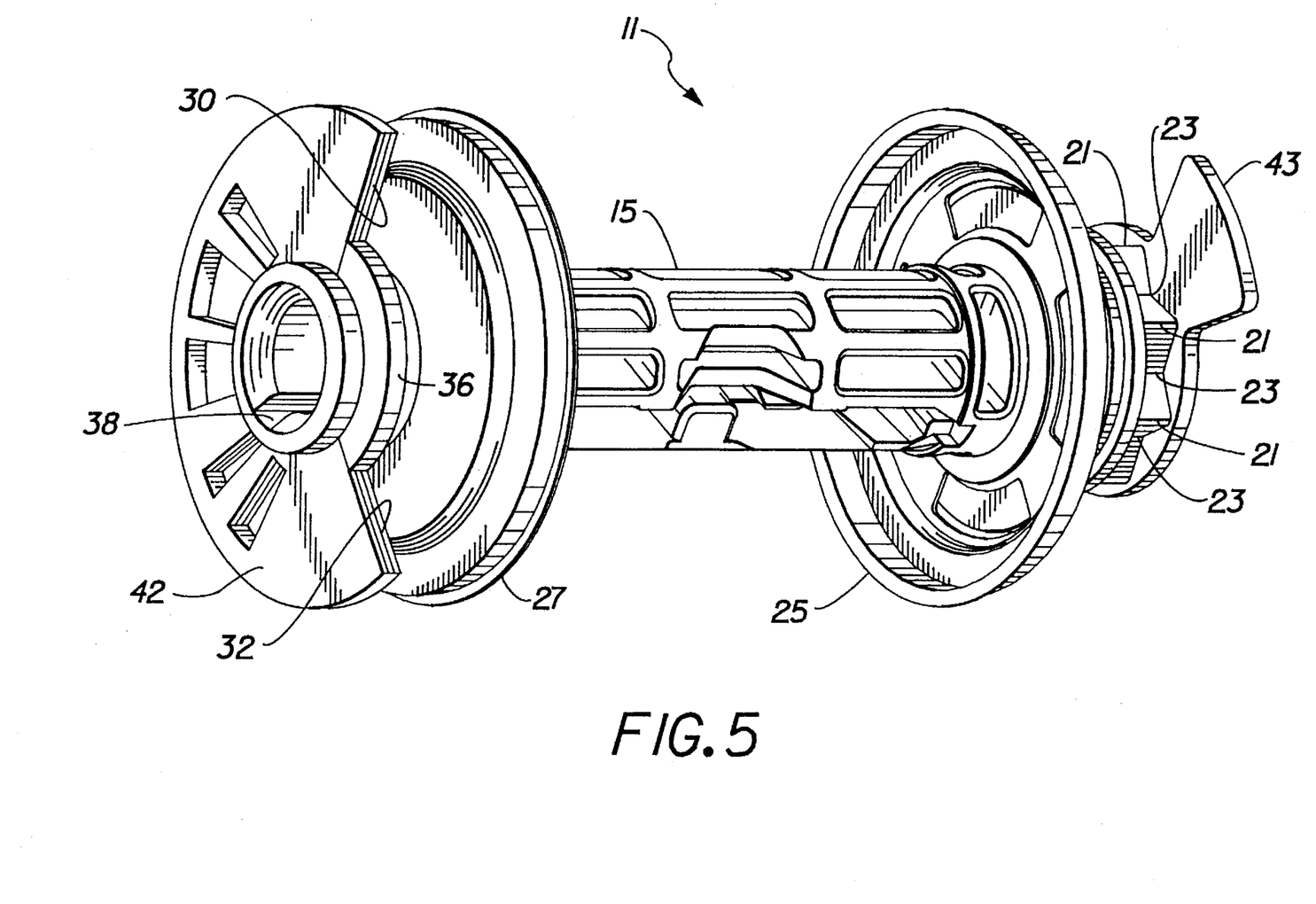
FIG. 5 is an assembled perspective view of the film spool of the film cassette.
Figure 6:
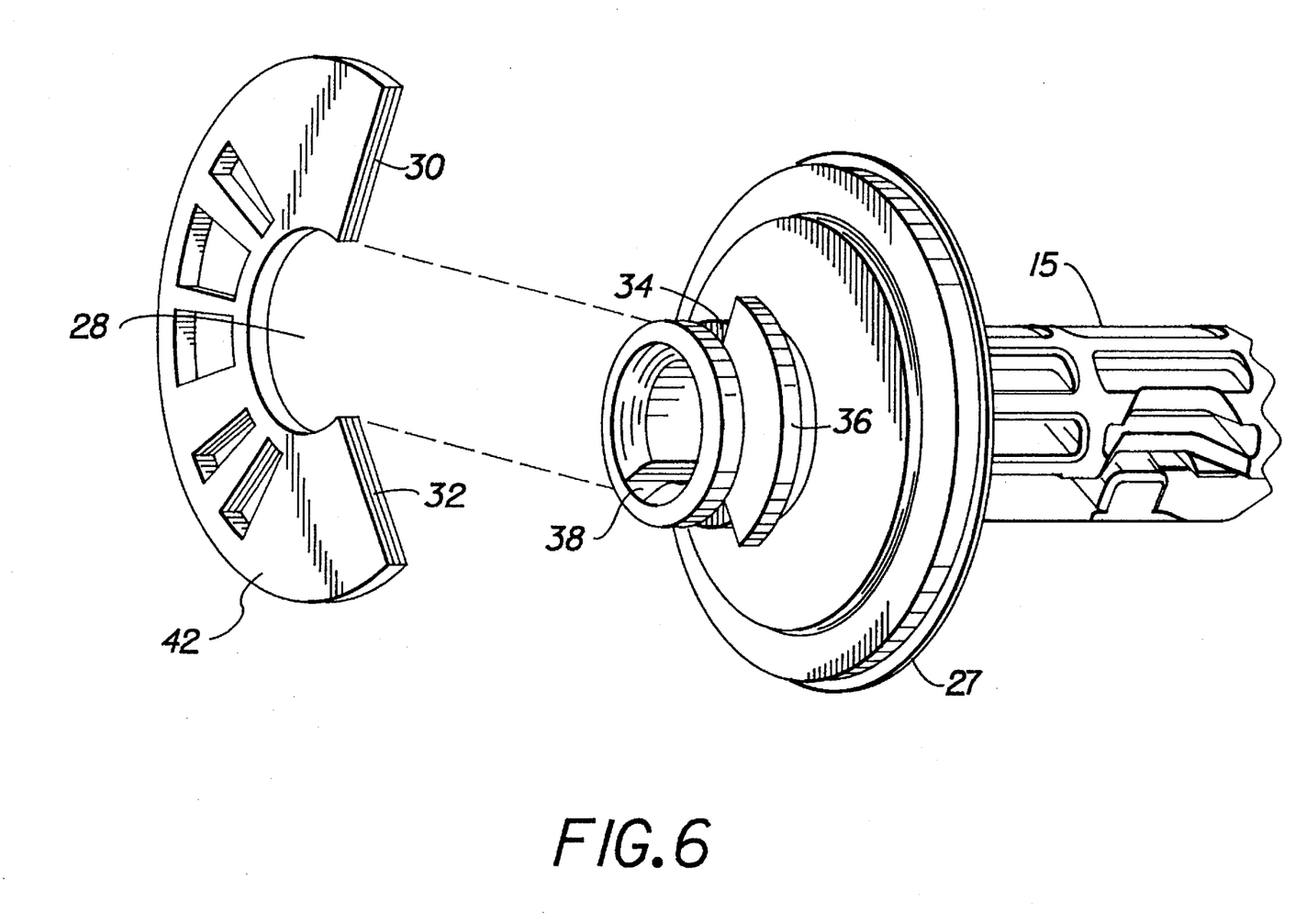
FIG. 6 is an exploded perspective view of one end of the film spool of the film cassette.

The spool core 15, as shown in FIGS. 1 and 5, has a toothed periphery consisting of successive symmetrical teeth 21 separated by interdental spaces 23, and the spool core also supports a pair of coaxial flanged disks 25 and 27 between which the filmstrip is stored in roll form. A trailing or inner end 29 of the filmstrip 13 is attached to the spool core 15.

Figure 2:
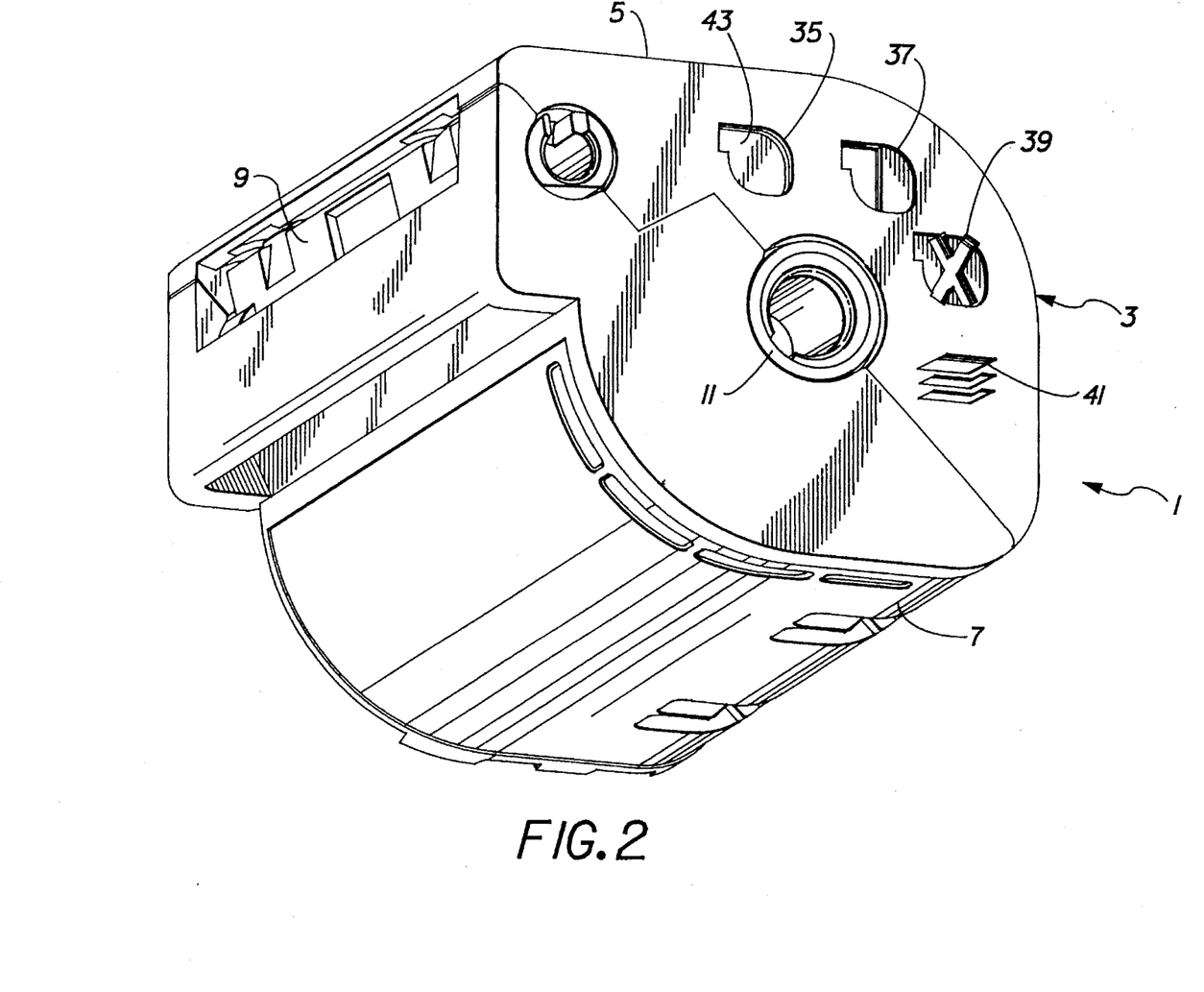
FIG. 2 is an assembled perspective view of the film cassette as seen from one end of the cassette shell.
Figure 3:
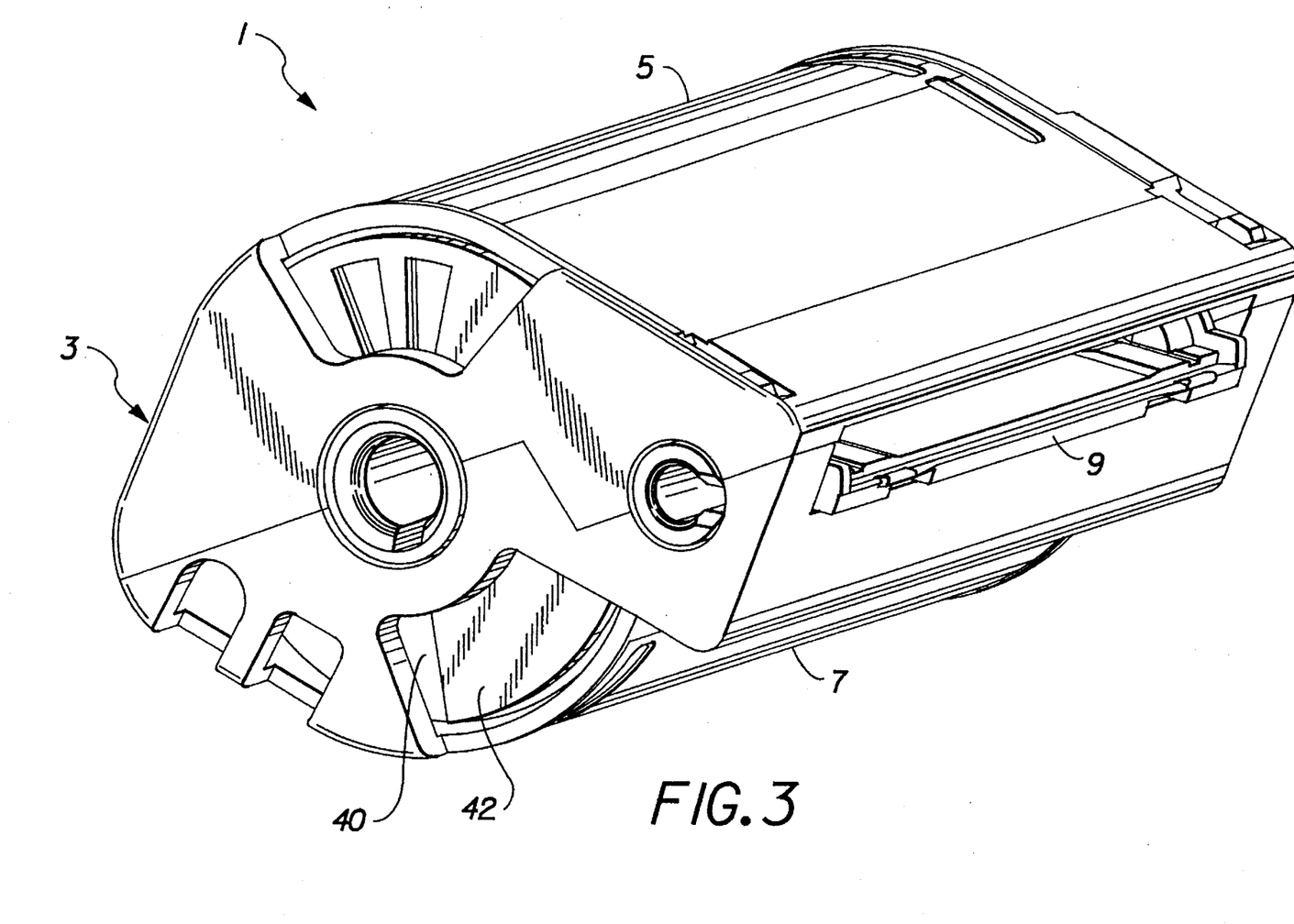
FIG. 3 is an assembled perspective view of the film cassette as seen from the remaining end of the cassette shell.
Figure 4:
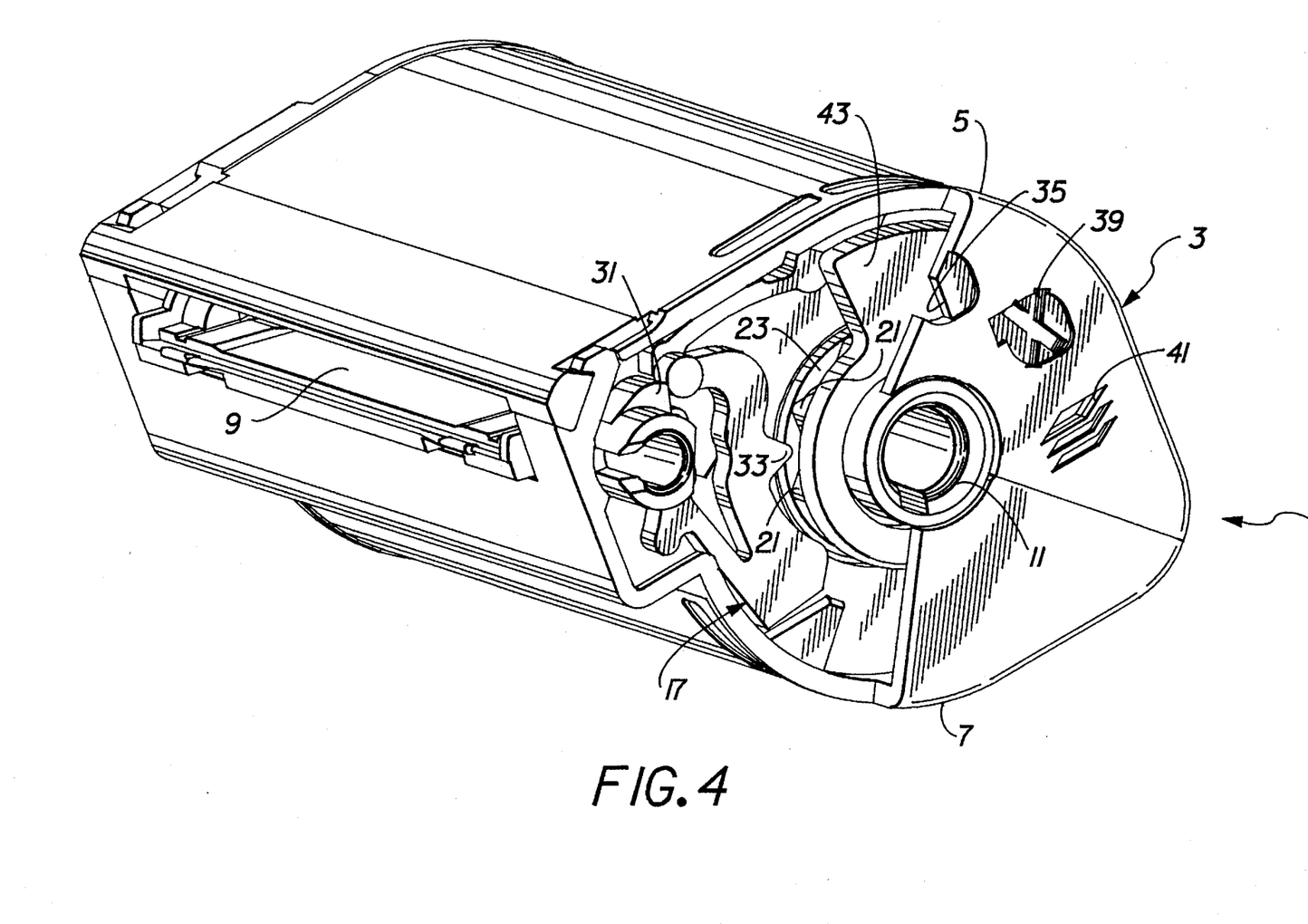
FIG. 4 is an assembled perspective view of the film cassette depicted with part of the cassette shell cut away to show a spool lock.

The light shielding door 9 as shown in FIGS. 2–4 includes integral cam means 31 for pivoting the spool lock 17 in a locking position as the door is closed. When the spool lock 17 is in its locked position, not shown, an integral detent 33 of the spool lock is located in anyone of the interdental spaces between two adjacent teeth 21 of the spool core 17 in anyone of a number of rotational orientations equal to the number of interdental spaces. If the light-shielding door 9 is opened as shown in FIG. 4, its cam means 31 is retracted from the spool lock 17. As a result, forcible rotation of the film spool 11 in the film-winding or unwinding direction will cause one of the two adjacent teeth 21 between which the detent 33 is located to eject the detent from the interdental space 23 separating those two teeth. Thus, the spool lock 17 will be pivoted out of its locking position.

The Film Exposure-Status Indicating Means of the Film Cassette

The shell half 5 at one of its ends has hour icons in the form of respective cutouts 35, 37, 39, and 41 shown in FIG. 2. The cutout 35 is designed to effect an indication that the filmstrip 13 is fresh or unexposed. The cutout 37 is designed to effect an indicating that the filmstrip 13 is partly exposed (and partly unexposed). The cutout 39 is designed to effect an indication that the filmstrip 13 is fully exposed. The cutout 41 is designed to effect an indication that the filmstrip 13 has been processed in a film processing machine to develop the latent images on the exposed film.

An indicator flag 43 is coaxially fixed to the spool core 15 at the remaining end of the spool opposite to the indicating status end of the cassette as shown in FIGS. 1 and 5, to be rotated with the film spool 11 in the film unwinding and film winding directions. Initially, the flag 43 is secured with the film spool 11 in a rotational orientation that locates the flag immediately beneath the cutout 35 as shown in FIG. 2, to provide an indication that the filmstrip is fresh or unexposed. Conversely, when the flag 43 is secured with the film spool 11 in a rotational orientation that locates the flag immediately beneath the cutout 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip is fully exposed. When the flag 43 is secured with the film spool 11 in a rotational orientation that locates the flag immediately beneath the cut-out 41, it is visible to provide an indication that the filmstrip 13 has been processed.

The film spool 11, as shown in FIGS. 1, 3, 5 and 6 includes a plastic disk 42 having a semi-circular configuration; that is, "c" shaped, including a central opening 28, and a pair of extreme ends 30 and 32. The spool core longitudinally extends through the central opening 28 of the disk 42 and has a peripheral groove 34 in which the disk is seated to secure the disk and the spool core coaxially together. A registration stop 36 is fixed to the spool core 15 adjacent the peripheral groove 34 and has a pair of stop ends arranged to abut the extreme ends 30 and 32 of the disk to critically orient the disk with respect to a key slot 38 of the spool core.

A window 40 provided in the shell half 7, FIG. 1 is intended to provide status indication of the film 13 contained in the cassette 1 in cooperation with the disk 42, the spool core 11 and the indicator flag 43. When the disk 42 covers the entirety of the window 40, FIG. 2, the film contained within the cassette 1 is wholly unexposed. When a portion (approximately one half) of the window 40 is covered by the disk 42, there is partly exposed film contained in the cassette, corresponding to the indicator flag 43 being present in the cutout 37. Finally, when all of the film in the cassette is exposed, the disk 42 is not visible within the window 40. Additional details regarding the described cassette are found in commonly assigned U.S. Pat. No. 5,296,887 issued to Zander, which is hereby incorporated by reference.

Double Exposure Prevention Means of the Camera

A first embodiment of the present invention is described with reference to FIGS. 7 and 8 which show sectional views of a camera loading chamber in which there is shown a portion of a camera body 44, including a film loading chamber 45 which is sized for receiving, in an endwise manner, the previously described film cassette 1. The chamber 45 includes an entry opening 47, and sidewall 51, defining a cylindrically shaped interior portion. A hinged film door 50 covers the entry opening 47, which can be opened about a pivot pin 52. An aperture or slot-like opening 49 along the sidewall 51 is sized for receiving the hook-shaped end 53 of a blocking member 55, pivotably mounted and secured by a support pin 59 and plate 61 to the camera body 44.

A switch element 63, made preferably from a spring material is attached at one end to the sidewall 51 adjacent to the bottom of the chamber 45 along with a parallel contact plate 65, each of which are fastened to the sidewall 51 by an insulated mounting plate 67 secured by mounting screws 68. The switch element 63 and the contact plate 65 extend along the exterior of the sidewall 51 and across the aperture 49. The remaining end of the spring-like switch element 60 is in contact with the blocking member 55 at a post-like support 60 in a manner which biases the hook-shaped end 53 into the chamber 45, as shown in FIG. 5, as well as simultaneously biasing a portion of the switch element 63 into contact with a contact portion 66 of the contact plate 65.

The contact plate 65 and the switch element each provided electrical inputs to an interconnected controller 69, such as a microprocessor, which is also connected to a bidirectional motor 71 that forms a portion of a film loading means (not shown) for thrusting film from a loaded film cassette 1. For purposes of the following discussion, the aperture 49 is aligned with the window 40 of the status indicator end of a film cassette 1, FIG. 2, for reasons described below.

Figure 7:
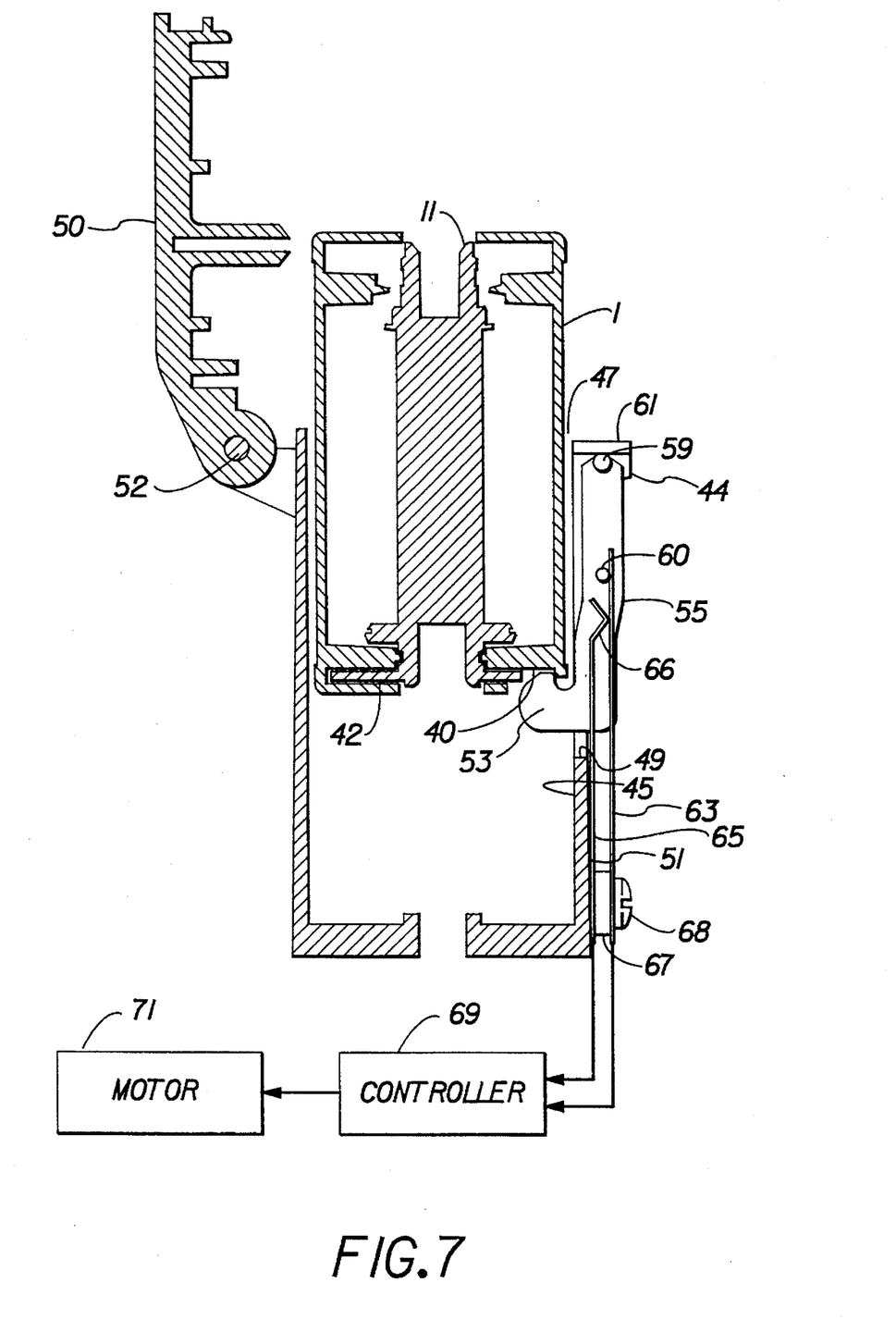
FIG. 7 is a sectional pictorial partial view of a camera film chamber including a double exposure prevention apparatus according to a first embodiment of the present invention, illustrating the blocking of an exposed or partially exposed film cassette by a blocking member.

In operation, a film cassette 1 containing exposed film is shown in FIG. 7 as it is inserted status indicator end first into the chamber 45 through entry opening 47. Because the cassette does not contain fully unexposed film, the plastic disk 42, FIG. 3, is not present in the window 40 when the cassette end is engaged by the biased hook-shaped end 53 of the blocking member 55. The window 40 is sized to receive the hook-shaped end 53 which is unimpeded due to the absence of the plastic disk 42, FIG. 3. Therefore, as the cassette 1 is lowered into engagement with the blocking member 55, the hook-shaped end 53 enters the window 40 where it is bound on the cassette shell periphery, preventing the blocking member from being pivoted out of the chamber 45. As a result, the cassette 1 is blocked and further downward movement of the cassette is prevented. Additional details as to the interaction of the blocking member 55 with the film status indicator of the film cassette 1 can be found in commonly assigned U.S. Pat. Nos. 4,994,828, 5,032,861, 5,049,912, and 5,049,913, the contents of which are hereby incorporated by reference.

In the meantime, because the blocking member 55 has not significantly altered from its original biased position, the switch element 63 remains in biased contact with the contact plate 65. As is apparent from the FIG. 7, the film door 50 cannot be closed while the cassette 1 is blocked within the chamber 45.

Figure 8:
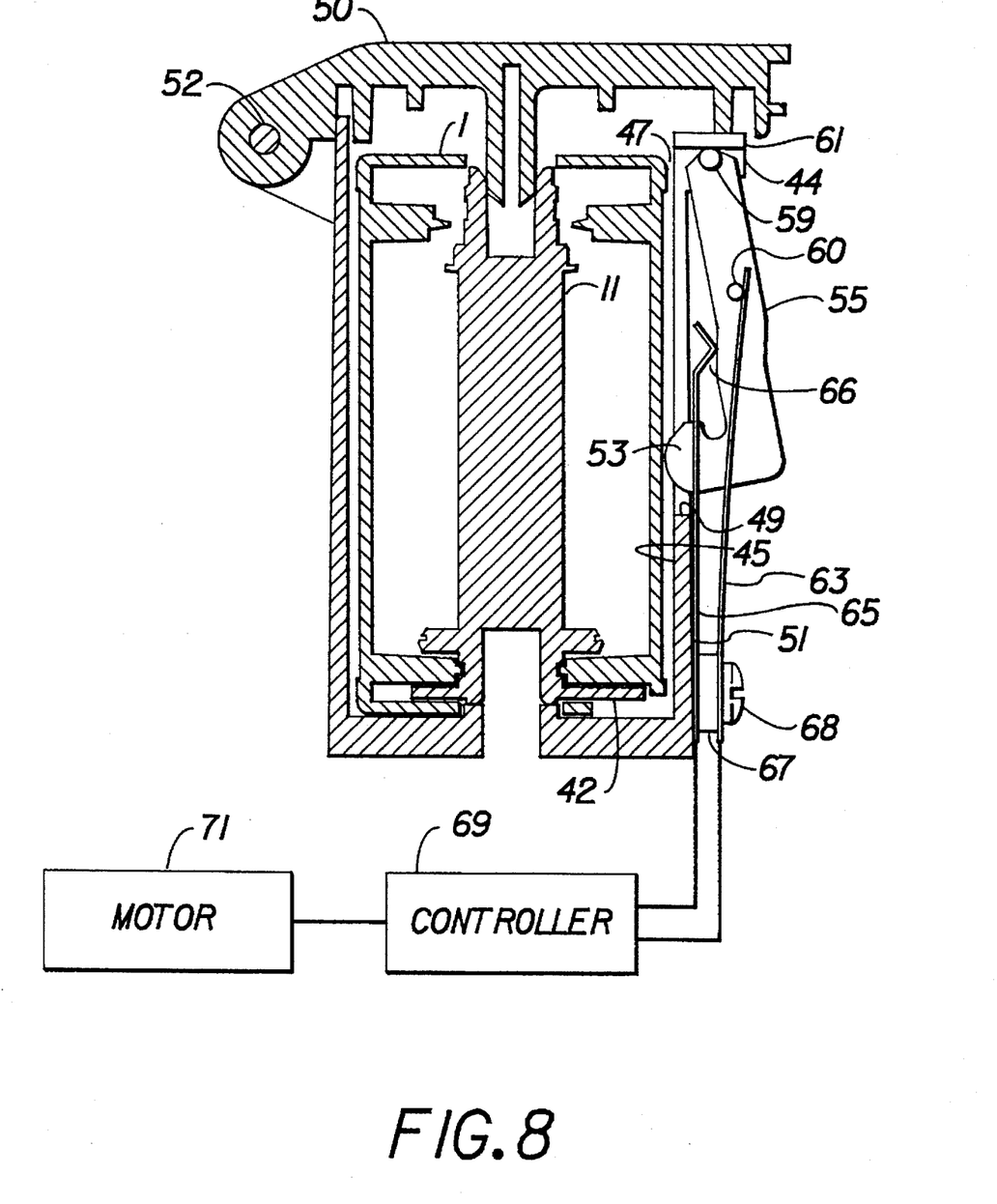
FIG. 8 is the sectional pictorial view of FIG. 7 illustrating the loading of a fresh film cassette into the film loading chamber of the camera.

Referring now to FIG. 8, and for comparison purposes a film cassette 1 containing fully unexposed film is shown loaded into the chamber 45. In this instance, as the cassette 1 is lowered into engagement with the hook-shaped end 53 of the blocking member 55, the plastic disk 42 is present in the window 40, FIG. 3. Therefore, the hook-shaped end 53 contacts the plastic disk 42, allowing the cassette 1 to pivot the blocking member 55 about the support pin 59 and out of the chamber 45 through the aperture 49, overcoming the biasing force supplied by the switch element 63. The switch element 63, due to its end attachments to the blocking member 55 at support 60 and the sidewall 51 by mounting screws 68, respectively, is caused to deflect due to the post support 60 bearing on the switch element 63 as the blocking member 55 is pivoted out of the chamber 45 by the cassette 1, breaking contact with the stationary contact plate 66.

The opening of the electrical connection between the contact portion 66 and the switch element 63 is sensed by the controller 69 which preferably contains logic which sets an internal load film flag. The setting of the internal flag is indicative that an unblocked film cassette containing unexposed film has been loaded into the chamber 45, and allows the controller 69 to automatically activate the bidirectional motor 71, preferably after the film door 50 has also been closed to load the unexposed film from the loaded cassette 1 in a known manner. If both conditions are met; that is that the film door 50 has been closed and the switch 63 has been opened from its normally closed position then the load film flag is set by the controller 69; see FIG. 13.

Figure 13:
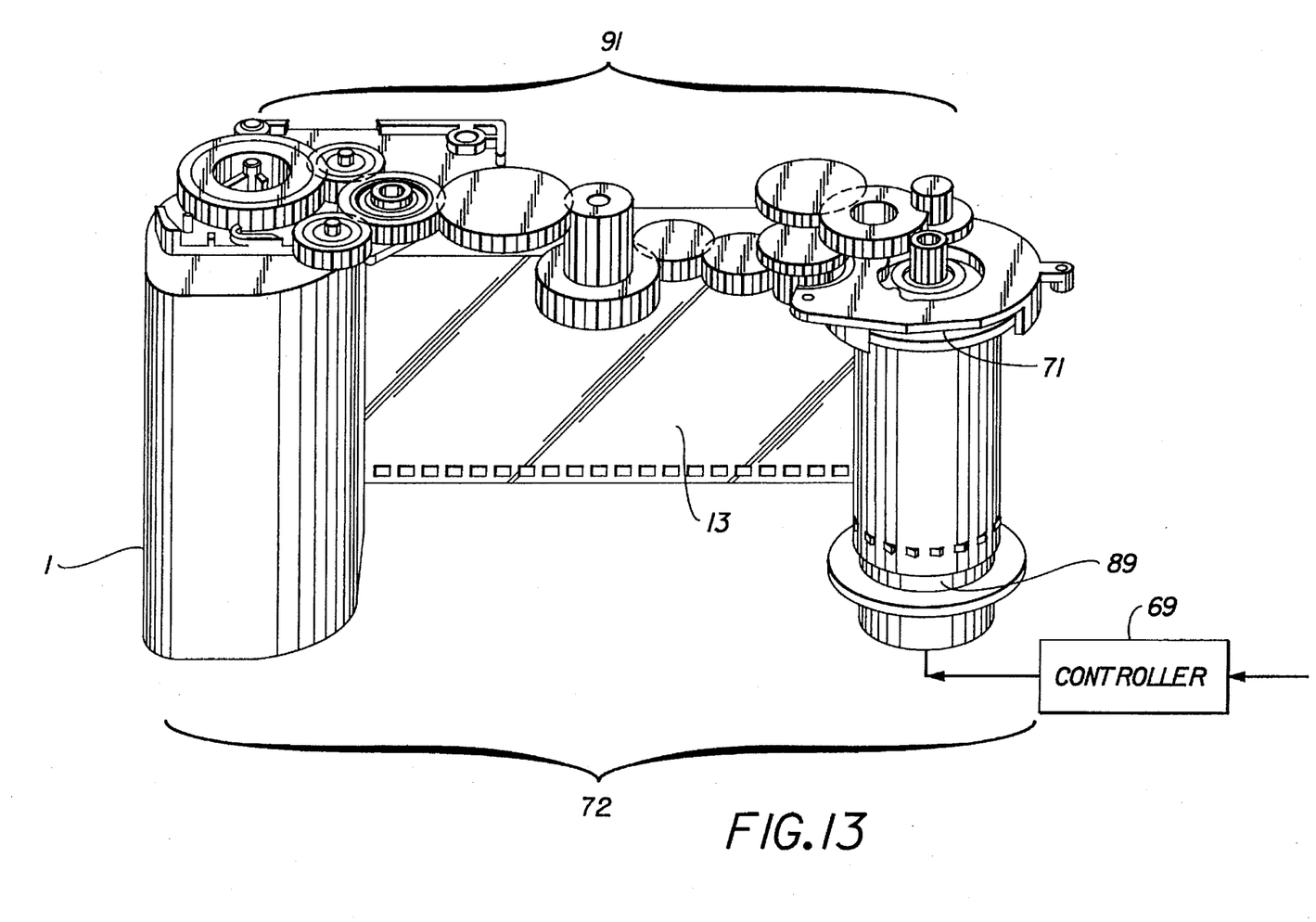
FIG. 13 is a semi-diagrammatical view showing the relationship of the controller, film drive system and film cassette of the apparatus of FIGS. 9–12.

The controller 69 is preferably programmed to clear the load film flag after the film has been loaded from the cassette 1, see FIG. 13. The clearing of the load film flag prevents film from being reloaded from a cassette 1 until the switch element 63 has been reset from its opened to its biased position by removing the cassette from the chamber 45, and subsequently reopening the switch element which can only be done by inserting an unblocked film cassette. Additional details as to the working of the switch element to prevent the double exposure of a loaded film cassette can be found in U.S. patent application Ser. No. 08/386,792 filed concurrently herewith by J. David Cocca, Paul L. Taillie, and Beth A. O'Leary and entitled: DOUBLE EXPOSURE PREVENTION APPARATUS FOR CAMERAS USING THRUST TYPE FILM CARTRIDGES which is hereby incorporated by reference.

In addition, the switch element 63 can include multiple states to provide user feedback as to the status of a loaded cassette in combination with a display device, such as an LCD. Additional details are provided in commonly assigned and copending U.S. patent application Ser. No. 08/385,292, incorporated by reference herein.

Referring now to FIGS. 9–14, there is shown a second embodiment of a double exposure prevention apparatus 100 according to the present invention. Similar parts used in this embodiment are labeled with the same reference numerals used from the previously described embodiment, for the sake of clarity.

A camera loading chamber 45 is sized for receiving a previously described film cassette 1, and includes sidewall 51 and a defined entry opening 47 which is covered by a hinged film door 50. A blocking member 101, having a hook-shaped end 103, is pivotally movable about a support pin 59. A portion of the blocking member 101, including the hook-shaped end 103 is initially biased into the interior of the chamber 45 for engagement with a loaded film cassette 1, by a cartridge sensing member 111, which is attached by an insulated mounting plate 117 to the sidewall 51 by screws 119.

The cartridge sensing member 111 includes a retaining portion 120, preferably a bent spring-like element, having a hooked end 121 for engagement with an aperture 109 of the hook-shaped end 103 which is located adjacent the support pin 59. Retaining portion 120 retains the blocking member without the need of a plate 61, FIGS. 7 and 8 as well as biases a portion of the blocking member 101 into the chamber 45. The sensing member 111 also includes a contact surface portion 113, and a parallel switch element portion 115, which depend from the mounting plate 117 and across the aperture 49. The switch element portion 115 is preferably made from a spring-like material and is biased at one end into contact with the contact surface portion 113 when the sensing member is attached to the sidewall 51.

Figure 9:
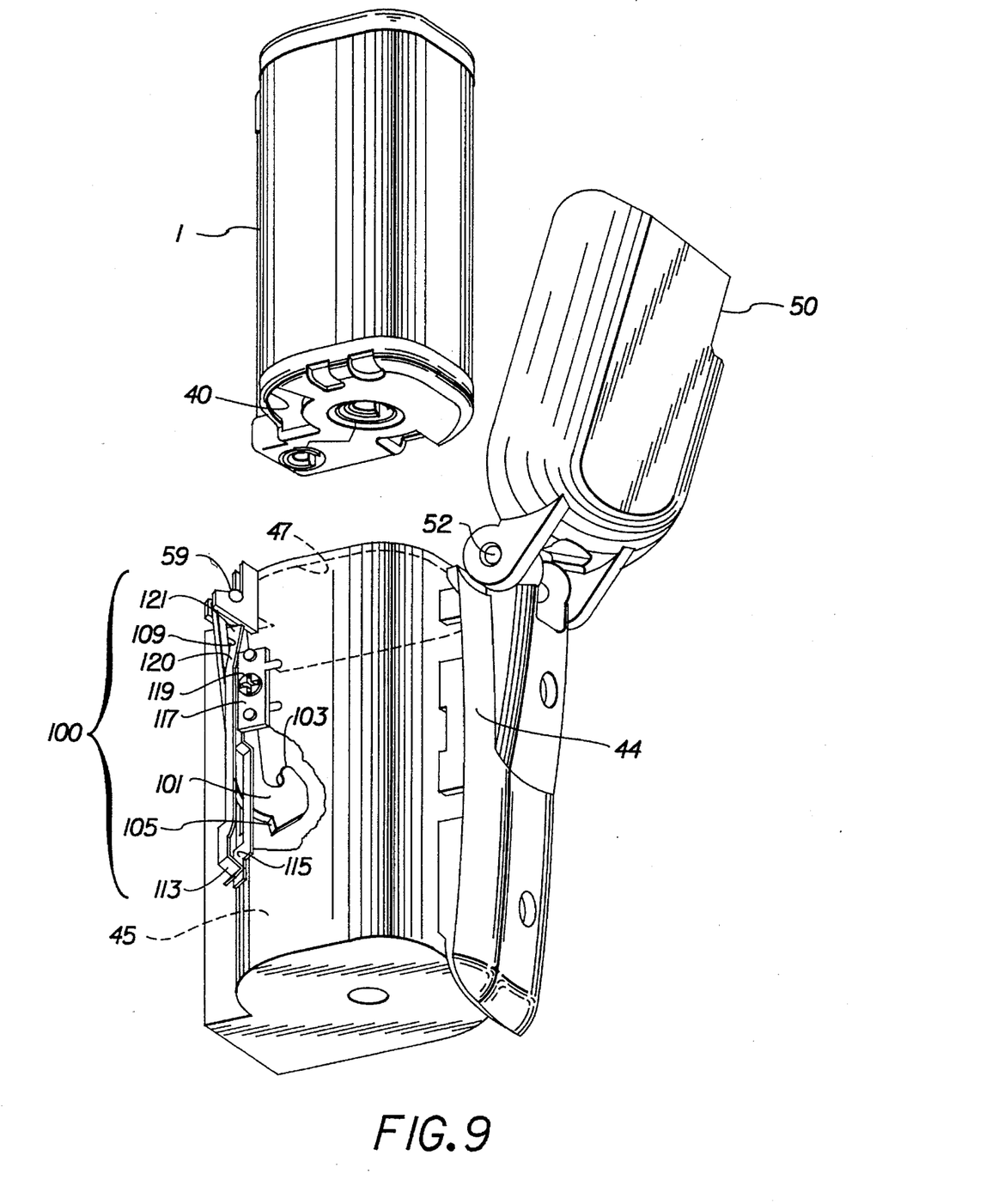
FIG. 9 is an isometric view of a camera having a double exposure prevention apparatus according to a second embodiment of the present invention.
Figure 10:
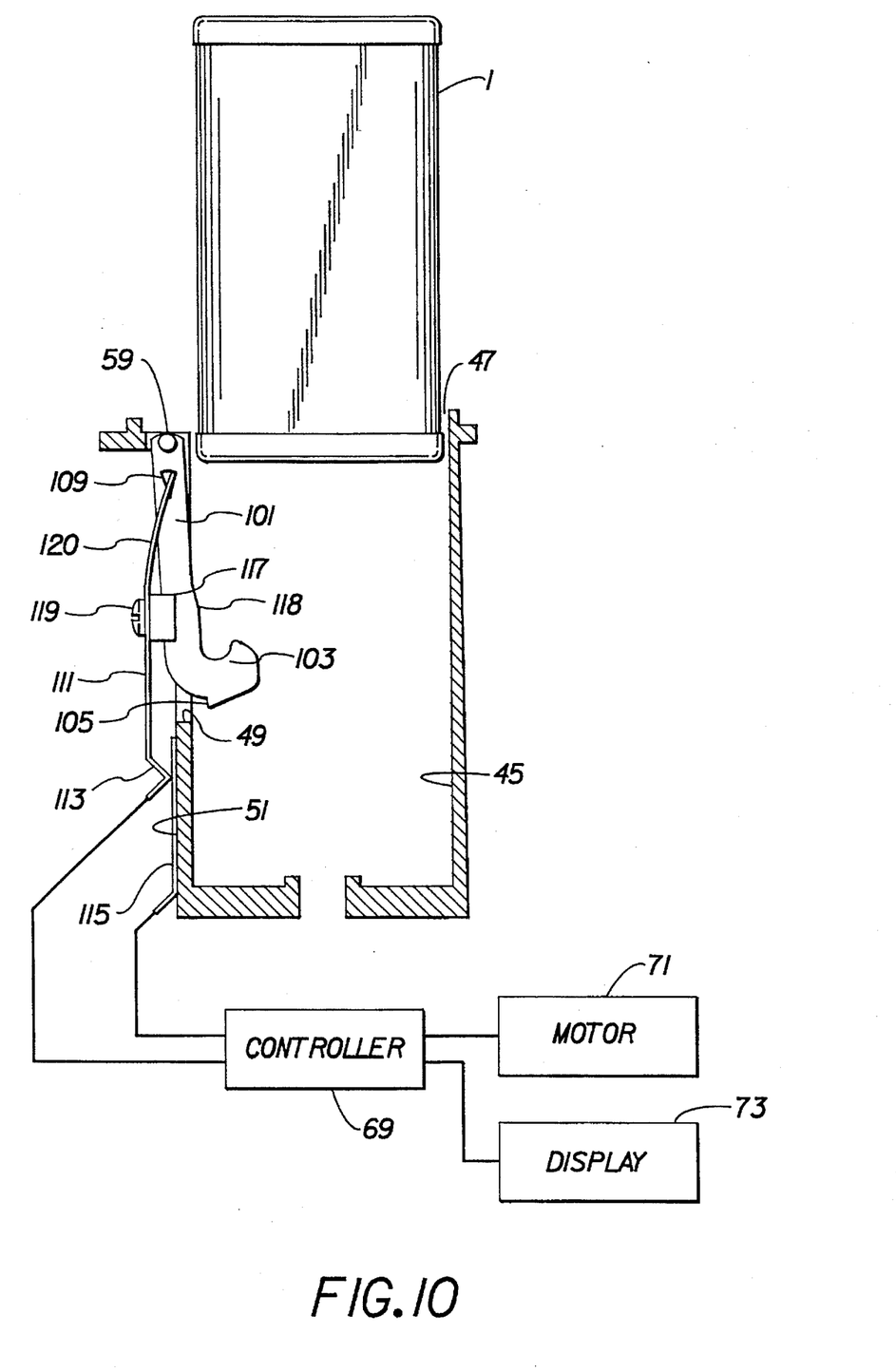
FIG. 10 is the sectional view of a camera loading chamber having the double exposure prevention apparatus shown in FIG. 9.

When attached, as shown in FIGS. 9 and 10, the cartridge sensing member 60 simultaneously retains and biases the blocking member 55 into the chamber 45 due to the spring force supplied by the retaining portion 120 with the aperture 109, as well as the switch element portion 115 with the contact surface portion 113.

Referring to FIG. 10, the contact surface portion 113 and the switch element portion 115 of the cartridge sensing member 111 are electrically interconnected as inputs to a controller 69, such as a microprocessor. In turn, the controller 69 is coupled to the bi-directional motor 71 of a film drive system 91, FIGS. 12–13, as well as a display device 73, such as an LCD.

Figure 11:
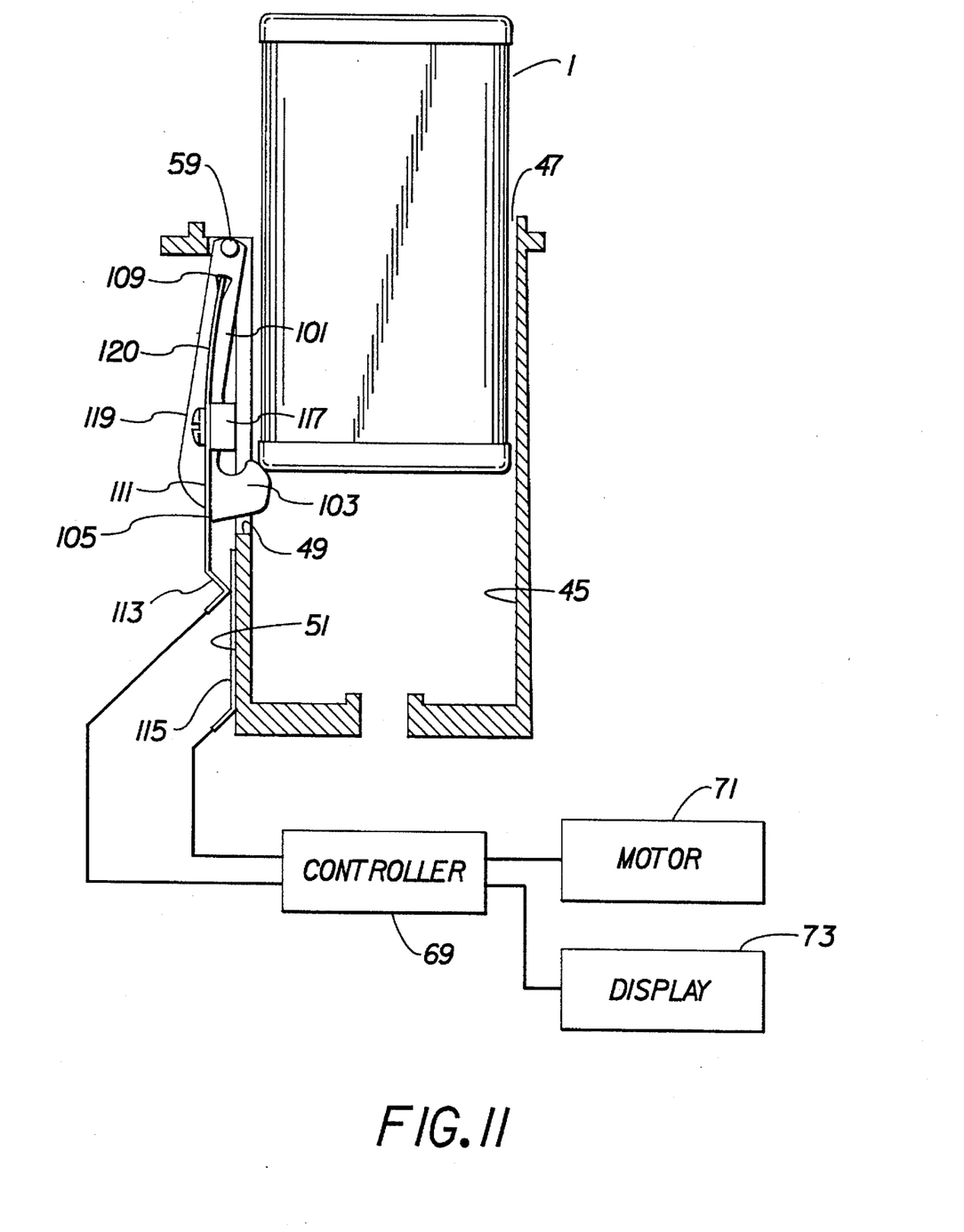
FIG. 11 is the sectional view of FIG. 10 showing a film cassette which is partially loaded into the film loading chamber.
Figure 12:
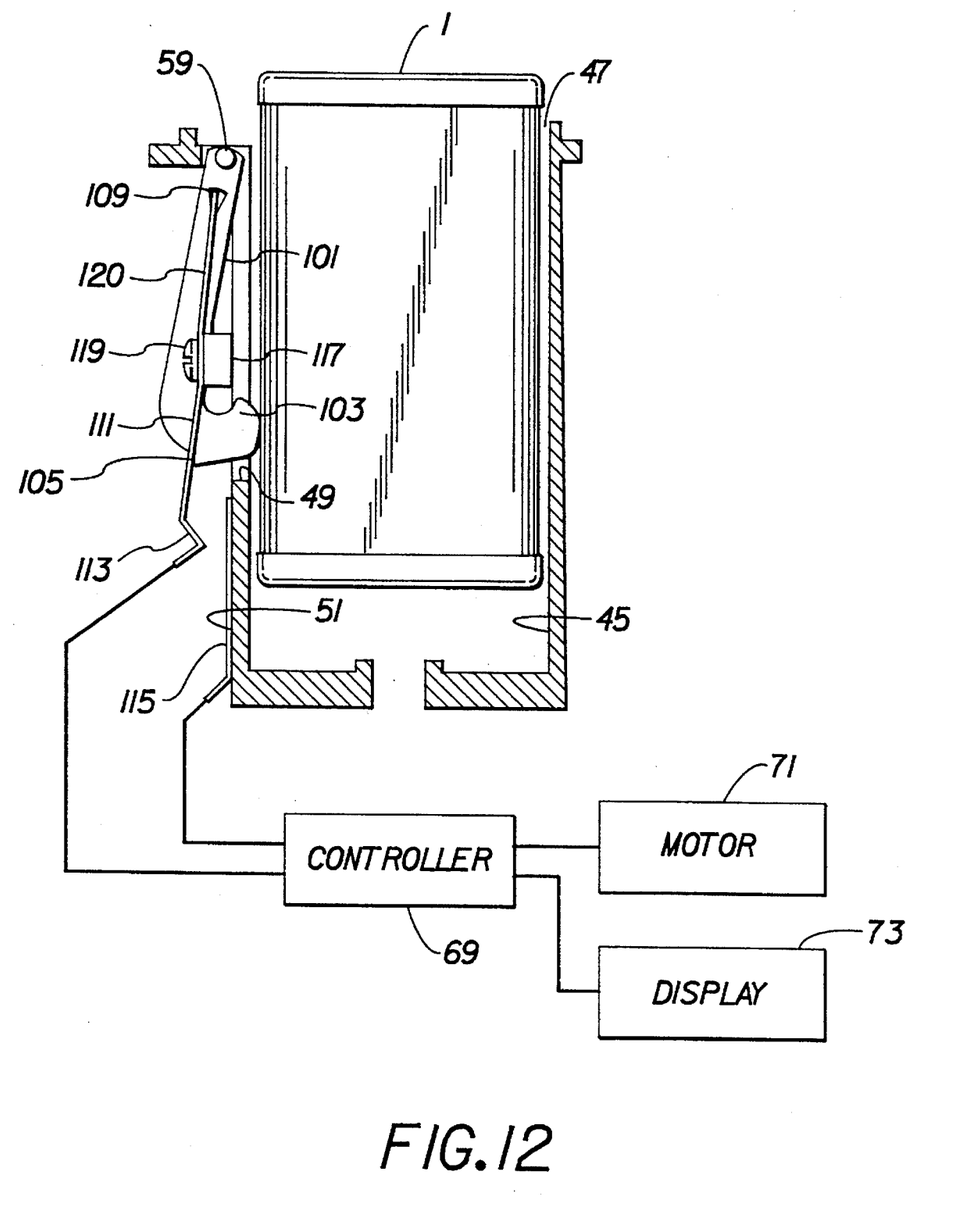
FIG. 12 is the partial sectional view of FIG. 11 illustrating a film cassette which is fully loaded in the film loading chamber.

In operation, a film cassette 1 containing fully unexposed film is diagrammatically shown in the FIGS. 10–12, and is inserted endwise into the loading chamber 45, status indicator side first, through the entry opening 47 by opening the film door 50, FIG. 9, (omitted from the FIGS. 10–12 for clarity). As previously noted, the hook-shaped end 103 of the blocking member 101 is initially biased into the interior of the chamber 45 by the retaining portion 120, and the spring like switch portion 113 is biased into contact with the surface portion 115.

As the film cassette 1 descends vertically into the chamber 45, contact is first made between a protruding portion 118, seen in FIG. 10, of the blocking member 55 and the film cassette 1. The protruding portion 118 of the blocking member 55 is preferably contoured to allow the film cassette 1 to gradually descend without jarring contact with the hook-shaped end 53, or without binding the cassette prematurely in the chamber 45. In addition, contact between the protruding portion 118 and the film cassette 1 causes the blocking member 101 to pivot slightly about support pin 59 in order to more correctly align the hook-shaped end 105 with the window 40. The slight clockwise (according to the convention of the illustrated embodiment) movement of the blocking member 101 is sufficient to overcome the biasing force of the retaining portion 120 is insufficient to break contact between the switch portion 115 and the contact surface portion 113.

Referring to FIG. 11, the film cassette 1, and particularly the plastic disk 42 in the window 40 has engaged the hook-shaped end 103 of the blocking member 101, urging the blocking member out of the chamber 45 through the aperture 49, and overcoming the spring force supplied by the retaining portion 120. Details relating to the interaction of the plastic disk 42 with the blocking member 55 are described in the previously incorporated and commonly assigned U.S. Pat. Nos. 4,994,828, 5,032,861, 5,049,912 and 5,049,913. As the status indicator end of the film cassette 1 vertically descends into the chamber 45 beyond the aperture 49, FIG. 10, the hook-shaped end 103 of the blocking member 101 continues to pivot about support pin 59 and against the biasing force supplied by the retaining portion 120 of the sensing member 111 until the back surface 105 contacts the switch portion 113. The biasing spring force of the switch portion 113 is now also overcome, moving the switch portion out of contact with the surface portion 115, which remains stationary throughout the loading sequence.

The breaking of the electrical contact between the switch portion 113 and the surface portion 115 is sensed by the controller 69, which contains logic to preferably set an internal load film flag. The setting of the internal flag by the opening of the switch portion 113 thereafter allows the controller 69 to enable the bidirectional motor 71, to rotate in a film advancing direction, as conventionally known, see FIG. 13, in order to engage the cassette 1 and load exposable film contained therein by thrusting the film after opening the light shielding door 9, FIG. 4, of the unblocked cassette 1, preferably after the film door 50, FIG. 7, has also been closed and the camera has been powered up, see FIG. 14. In addition, a corresponding signal can also be transmitted from the controller 69 to a display device 73, such as an LCD, as described in the previously incorporated U.S. patent application Ser. No. 08/385,292 in order to provide user feedback that an unexposed film cassette has been loaded into the film loading chamber 45.

Figure 14:
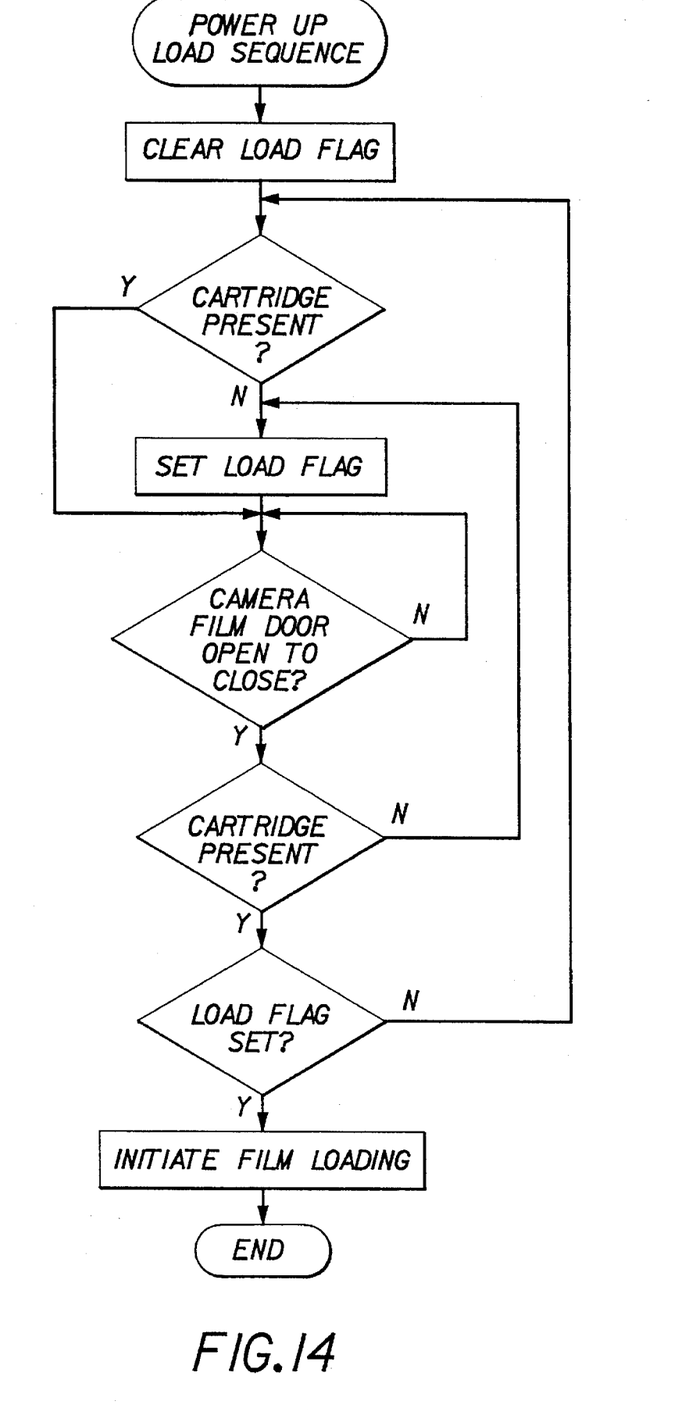
FIG. 14 is a logic diagram illustrating a sequence of operation of the above embodiments.

Once the film within the cassette 1 has been loaded, the controller 69 is preferably programmed to clear the internal load film flag, see FIG. 14. In order to reload film thereafter, the cassette 1 must be first be unloaded from the confines of the chamber 45 in order to reset the blocking member 101 and the switch portion 115 to their normal positions within the chamber 45 and in contact with the contact surface portion 113, respectively. A cassette containing exposable film, which will not be blocked by the blocking member 101, must then be inserted in order to pivot the blocking member out of the chamber, and to reopen the switch portion 115 in order to reset the internal load film flag and permitting film loading.

The invention has been described with reference to a preferred embodiment. However, it will be appreciated that variations and modifications can be effected by a person of ordinary skill in the art without departing from the scope of the invention. For example, the aperture 49 can be aligned with that portion of the window 40 having disk 42 in order to allow partly exposed film to be reloaded into a film loading chamber. This alignment is particularly advantageous for cameras having MRI logic.

| PARTS LIST FOR FIGS. 1–14 | |
|---|---|
| 1 | film cassette |
| 3 | cassette shell |
| 5 | shell half |
| 7 | shell half |
| 9 | light shielding door |
| 11 | film spool |
| 13 | filmstrip |
| 15 | spool core |
| 17 | spool lock |
| 19 | cassette covering label |
| 21 | teeth |
| 23 | interdental spaces |
| 25 | flanged disk |
| 27 | flanged disk |
| 28 | central opening |
| 29 | inner end |
| 30 | external end |
| 31 | cam means |
| 32 | external end |
| 33 | detent |
| 34 | peripheral groove |
| 35 | cutout |
| 36 | registration stop |
| 37 | cutout |
| 38 | key slot |
| 39 | cutout |
| 40 | window |
| 41 | cutout |
| 42 | plastic disk |
| 43 | indicator flag |
| 44 | camera body |
| 45 | loading chamber |
| 47 | entry opening |
| 49 | slot |
| 50 | film door |
| 51 | sidewall |
| 52 | pivot pin |
| 53 | hook-shaped end |
| 55 | blocking member |
| 57 | spring |
| 59 | support pin |
| 60 | support |
| 61 | plate |
| 63 | switch element |
| 65 | contact surface |
| 66 | contact portion |
| 67 | mount plate |
| 68 | screws |
| 69 | controller |
| 71 | motor |
| 73 | display device |
| 100 | double exposure prevention apparatus |
| 101 | blocking member |
| 103 | hook-shaped end |
| 105 | back surface |
| 109 | aperture |
| 111 | sensing member |
| 113 | switch portion |
| 115 | surface portion |
| 117 | mounting plate |
| 119 | screws |
| 120 | retaining portion |
| 121 | hooked end |

I claim:

1. In a camera, apparatus to be used with a film cassette having a film-exposure status indicator which is movable from an unexposed position, to indicate that a filmstrip within the cassette is unexposed, to a partly exposed position to indicate that the filmstrip is only partly exposed, and to a fully exposed position to indicate that exposure of the filmstrip is completed, said camera having a loading chamber sized for receiving said cassette, and blocking means cooperating with said status indicator by engagement therewith for preventing said cassette from entering said loading chamber when said status indicator indicates that film contained within the cassette has been at least partly exposed, is characterized by:

sensing means cooperating with said blocking means to sense the presence of a film cassette in said loading chamber, including biasing means for biasing said blocking means in said loading chamber for engagement with the status indicator of a loaded cassette wherein said sensing means includes a resettable switch element which is movable from a first position when no cassette is present in said chamber to a second position when an unblocked cassette is present in said chamber.

2. An apparatus as recited in claim 1, wherein said switch element is movable to a plurality of positions from said first position depending on the position of a loaded cassette in said chamber.

3. An apparatus as recited in claim 1, wherein said switch element is made from a spring material and is attachable to said blocking means to bias said blocking means into engagement with a said film cassette while simultaneously biasing said switch element into said first position.

4. An apparatus as recited in claim 3, wherein said switch element is moved from said biased first position to said second position when an unblocked cassette is loaded in said loading chamber.

5. An apparatus for use with a film cassette having a film exposure status indicator for indicating the presence of exposed, partly exposed, and fully exposed film, said camera having a loading chamber sized for receiving said cassette, and blocking means which cooperates with the film status indicator by engagement therewith to prevent a film cassette containing exposed film from being loaded in said chamber, is characterized by:

a resettable switch element which cooperates with said blocking means for sensing the presence of a film cassette in said loading chamber, said switching element being enabled when an unblocked cassette is loaded in said chamber, said switching element including means for biasing said blocking means for engagement with said film exposure status indicator prior to the loading of a said cartridge.

6. An apparatus as recited in claim 5, wherein said switch element includes means for retaining said blocking means.

7. An apparatus as recited in claim 5, including control means cooperating with said switch element for allowing film from an unblocked cassette to be loaded after said switch element has been enabled.

8. An apparatus as recited in claim 7, wherein said control means cooperates with said switch element to prevent reloading of film from said unblocked cassette until said switch element has been reset and is reenabled.

9. An apparatus as recited in claim 8, wherein said switch element is made from a spring material for simultaneously biasing said switching element in said first position and said blocking means for engagement with said film cassette.

10. An apparatus as recited in claim 9, wherein said blocking means includes a blocking member which is movable from a first to a second position, said blocking member being biased in said first position for engagement with the film status indicator by the switch element.

* * * * *